United States Patent [19]
Ohama

[11] 4,201,168
[45] May 6, 1980

[54] INTAKE MANIFOLD FOR ENGINE
[75] Inventor: Yasumichi Ohama, Mitaka, Japan
[73] Assignee: Honda Giken Kogyo Kabushiki Kaisha, Tokyo, Japan
[21] Appl. No.: 924,626
[22] Filed: Jul. 14, 1978
[30] Foreign Application Priority Data Jul. 18, 1977 [JP] Japan .................. 52-84982

[51] Int. Cl.² .......................................... F02M 31/00
[52] U.S. Cl. ...................... 123/122 AB; 123/122 AC; 123/32 ST; 123/32 SP
[58] Field of Search ........ 123/32 ST, 32 SP, 122 AB, 123/122 AC, 127, 52 MV

[56] References Cited
U.S. PATENT DOCUMENTS

| | | | |
|---|---|---|---|
| 3,850,153 | 11/1974 | Sigwald | 123/122 AB |
| 3,908,620 | 9/1975 | Maekawa | 123/122 AB |
| 3,972,324 | 8/1976 | Marsee | 123/122 AB |

FOREIGN PATENT DOCUMENTS 1514635 6/1978 United Kingdom .

*Primary Examiner*—Ronald H. Lazarus
*Attorney, Agent, or Firm*—Lyon and Lyon

[57] ABSTRACT

An intake manifold for a multi-cylinder internal combustion engine contains a first distribution cavity and a plurality of passages for delivering a relatively lean air-fuel mixture to the main combustion chambers of the engine. This first cavity is fed from a carburetor through a main primary opening and a main secondary opening. The manifold also has a second distribution cavity and passages for delivering a relatively rich air-fuel mixture to auxiliary combustion chambers of the engine. This second cavity is fed from another carburetor through an auxiliary opening. A water jacket employs hot water from the engine cooling system to heat both of the distribution cavities, but the construction is such as to avoid heating lean air-fuel mixture introduced into the manifold through the main secondary opening. The water jacket lies below the distribution cavities. Two spaced inlets for hot water are provided at relatively high elevations and one outlet is provided at a lower elevation, to avoid formation of unwanted air pockets.

4 Claims, 5 Drawing Figures

INTAKE MANIFOLD FOR ENGINE

This invention relates to internal combustion engines of the type having a plurality of cylinders each provided with a main combustion chamber and an auxiliary combustion chamber. A relatively lean air-fuel mixture is supplied to the main combustion chambers and a relatively rich air-fuel mixture is supplied to the auxiliary chambers.

More particularly, this invention is directed to the construction of an intake manifold which receives a lean air-fuel mixture from a carburetor supplying a main primary opening and a main secondary opening and also receives a relatively rich air-fuel mixture from a carburetor through an auxiliary opening. The main secondary opening functions only when the engine is operating under substantial load.

It is desirable to heat the relatively rich mixture to avoid formation of droplets and to insure good vaporization of the fuel. For the same reasons it is also desirable to heat that portion of the relatively lean air-fuel mixture which enters the intake manifold through the main primary opening, but is not desirable to heat that portion of the lean air-fuel mixture which enters the main secondary opening while the engine is operating under substantial load, because of the resultant reduction in volumetric efficiency.

It is the principal object of this invention to employ heat from the engine cooling system to heat the relatively rich air-fuel mixture and also to heat the portion of the relatively lean air-fuel mixture which enters the intake manifold through the main primary opening from the carburetor. A water jacket is provided which heats mixture distribution cavities within the manifold but does not heat that portion of the relatively lean air-fuel mixture which enters the manifold through the main secondary opening.

Other and more detailed objects and advantages will appear hereinafter.

Figure 1:
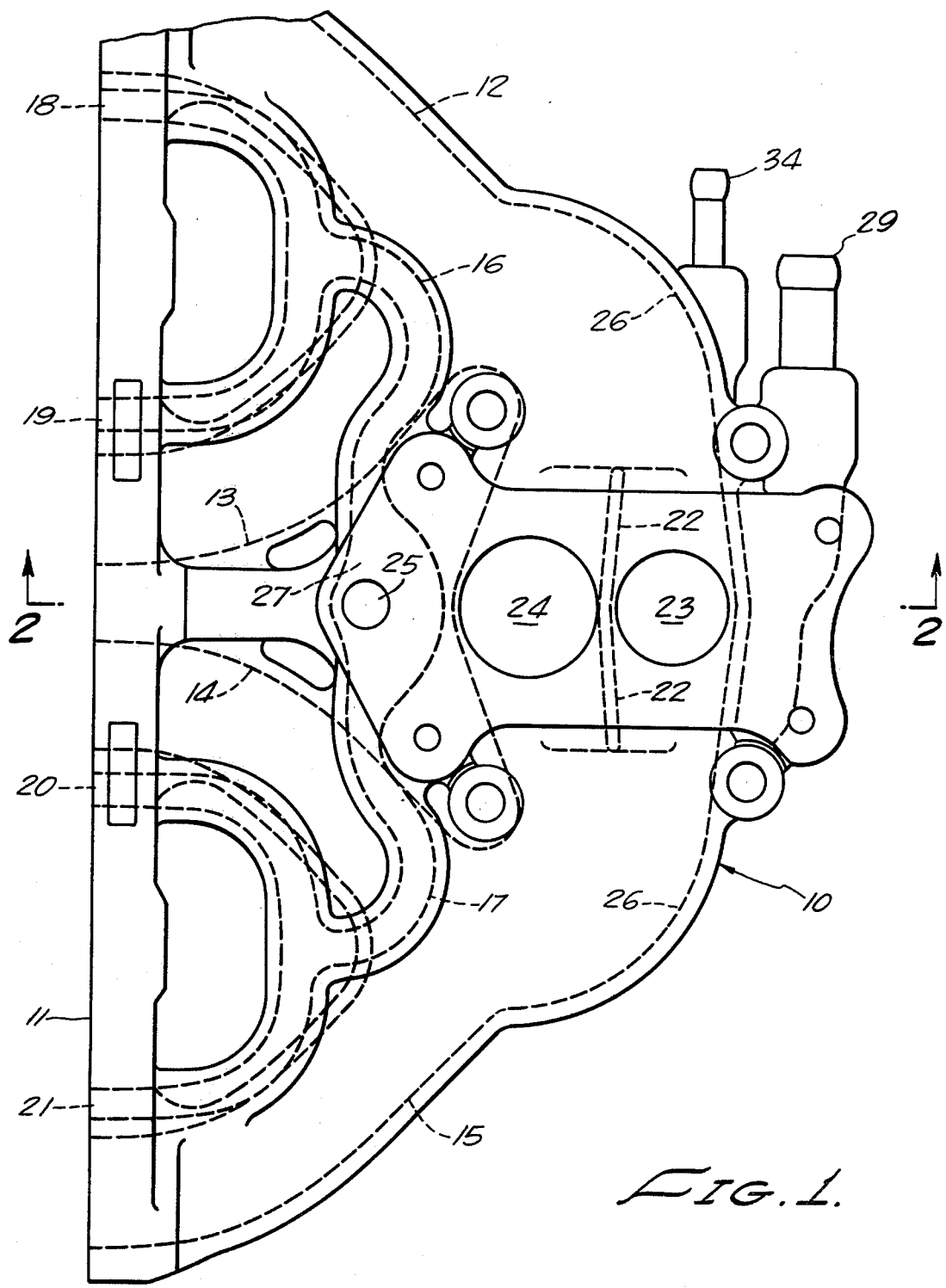
FIG. 1 is a plan view partly broken away, showing a preferred embodiment of this invention.

Referring to the drawings, the intake manifold 10 is intended for use with a four-cylinder internal combustion engine. One side wall 11 is constructed in the form of a flange to be bolted or otherwise attached to a side wall of the engine, not shown. Passages 12, 13, 14 and 15 are formed within the intake manifold 10 for distributing a relatively lean air-fuel mixture to the main combustion chambers of the engine. Also formed within the intake manifold 10 are smaller passages 16, 17, 18, 19, 20 and 21 which supply relatively rich air-fuel mixture to auxiliary combustion chambers of the engine, not shown.

The openings 23, 24 and 25 are located in the same plane. The main primary opening 23 and the main secondary opening 24 convey a relatively lean air-fuel mixture from a first carburetor, not shown, to a distribution cavity 26 which communicates with the passages 12, 13, 14 and 15. A short divider wall 22 in the distribution cavity 26 separates flows from the openings 23 and 24. The auxiliary opening 25 conveys a relatively rich air-fuel mixture from the second carburetor, not shown, to a distribution cavity 27 which communicates with the smaller passages 16 and 17, and through them to the smaller passages 18, 19, 20 and 21. The main combustion chambers of the engine are thus supplied with relatively lean air-fuel mixture from the large passages 12, 13, 14 and 15, while the auxiliary combustion chambers of the engine are supplied with relatively rich air-fuel mixture from the smaller passages 18, 19, 20 and 21.

It is desirable to heat the relatively rich air-fuel mixture as it passes through the distribution cavity 27 and to heat the relatively lean air-fuel mixture admitted through opening 23 in order to minimize the presence of droplets and promote vaporization of the fuel. However, it is undesirable to heat the relatively lean air-fuel mixture passing through the main secondary opening 24. The reason for this is that the carburetor supplies mixture to the opening 24 only when the engine is operating under substantial load, and if the mixture passing through the opening 24 were to be heated, a substantial loss in volumetric efficiency would be suffered. Accordingly, it is the purpose of this invention to heat the mixture entering the intake manifold through the openings 23 and 25 and to avoid heating the mixture that passes through the opening 24.

Figure 3:
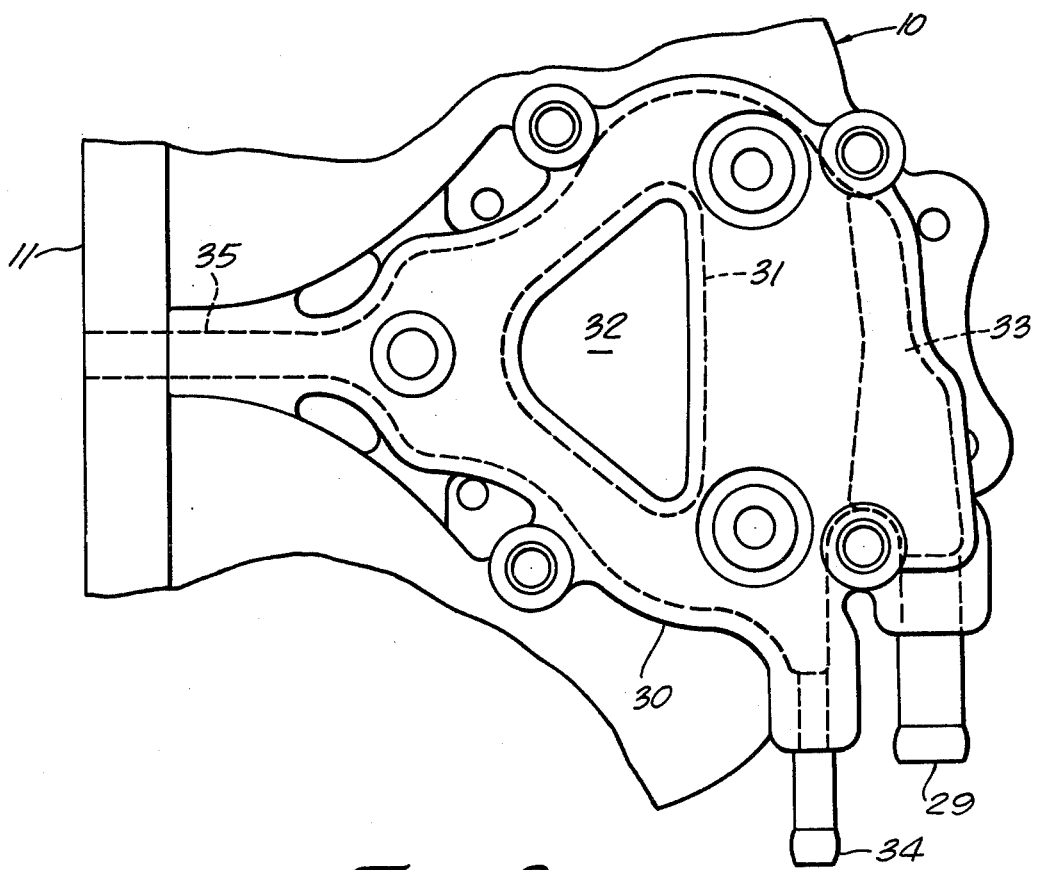
FIG. 3 is a bottom view partly broken away, showing a portion of the device of FIG. 1.
Figure 4:
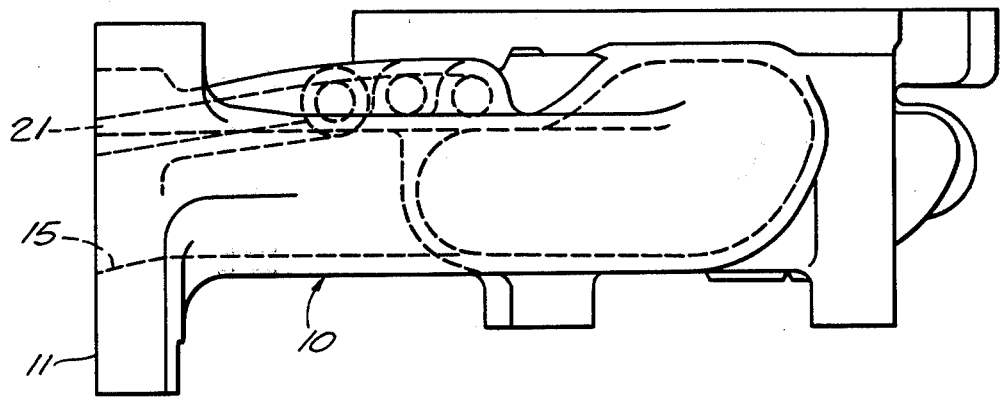
FIG. 4 is a side elevation.
Figure 5:
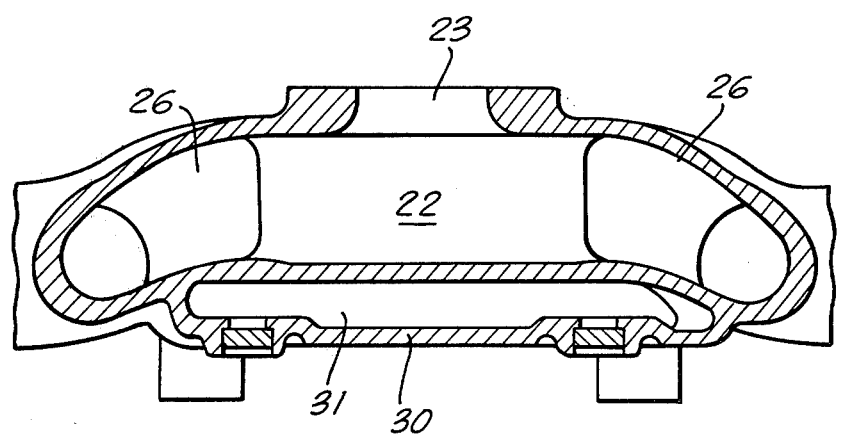
FIG. 5 is a sectional end elevation taken substantially on the lines 5—5 as shown in FIG. 2.

In accordance with this invention, heat from the engine cooling system is used for heating the relatively lean air-fuel mixture in the distribution cavity 26 and for heating the relatively rich air-fuel mixture in the distribution cavity 27. Thus, hot water (or coolant) is admitted through the inlet pipe 29 and into the water jacket 30 which is of generally triangular shape and which underlies the distribution cavities 26 and 27. As shown in the bottom view of FIG. 3, the heating chamber 31 within the water jacket 30 has common walls with each of the distribution cavities 26 and 27. This heating chamber 31, however, does not underlie the generally triangular zone 32 below that portion of the distribution cavity 26 which is fed from the main secondary opening 24. A curved portion 33 of the water jacket 30 allows the heating chamber 31 to encompass a portion of the side wall of the distribution cavity 26. The hot water from the inlet 29 first enters this curved extension portion 33 and then passes around through the heating chamber 31 and is discharged through the outlet 34.

Figure 2:
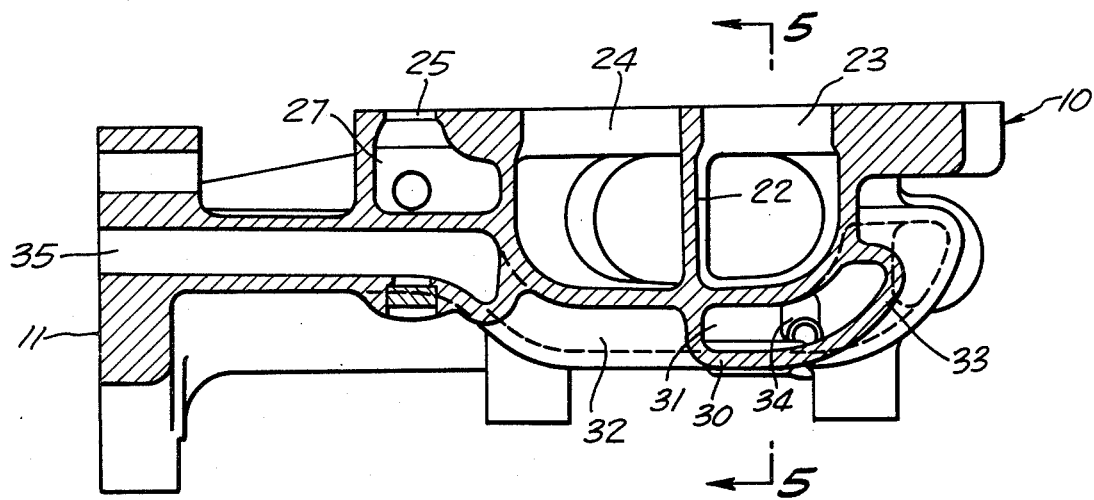
FIG. 2 is a sectional side elevation taken substantially on the lines 2—2 as shown in FIG. 1.

A second inlet 35 for hot water is provided in the flange 11 and this inlet 35 communicates with the interior of the heating chamber 31, as best shown in FIG. 2. The volume of hot water which passes through the inlet 35 is less than the volume which passes through the inlet 29. The main purpose of the hot water inlet 35 is to prevent the accumulation of air at any location in the heating chamber 31; such an air accumulation would reduce the quantity of heat passing from the heating chamber 31 to the distribution cavities 26 and 27. The hot water inlets 29 and 35 are located at a relatively high elevation as compared to the main portions of the heating chamber 31, and this construction also serves to minimize formation of unwanted air pockets.

In operation, hot water flowing from the inlet 29 into the curved extension 33 of the heating chamber 31 passes downward through the interior of the water hacket 30, through the heating chamber 31, and is discharged through the outlet 34. Hot water admitted through the second inlet 35 prevents buildup of unwanted air pockets. The absence of a water jacket in the triangular space 32 minimizes the transfer of heat into the relatively lean air-fuel mixture which passes into the intake manifold through the main secondary opening 34.

Having fully described my invention, it is to be understood that I am not to be limited to the details herein set forth but that my invention is of the full scope of the appended claims.

I claim:

1. For use with an internal combustion engine having a plurality of main combustion chambers and a plurality of auxiliary combustion chambers, an intake manifold comprising, in combination: a main primary opening communicating with a main distribution cavity for a relatively lean air-fuel mixture, a main secondary opening communicating with the same cavity, an auxiliary opening communicating with an auxiliary distribution cavity for a relatively rich air-fuel mixture, passages in the intake manifold establishing communication from said main distribution cavity to the engine, additional passages in the intake manifold establishing communication from the auxiliary distribution cavity to the engine, said main distribution cavity being divided by wall means to form a first sub-cavity and a second sub-cavity, said first and second sub-cavities communicating with the main primary opening and the main secondary opening respectively, a hot water jacket positioned below the main and auxiliary distribution cavities having a water passage spaced apart from the area below the second sub-cavity, in order to avoid direct contact and rapid transfer of heat between said second-sub-cavity and said water passage, both bottom walls of the auxiliary distribution cavity and the first sub-cavity being in direct contact with said water passage for rapid transfer of heat into the auxiliary distribution cavity and the first sub-cavity, means for introducing hot water into heating chamber, and an outlet from said heating chamber.

2. For use with an internal combustion engine having a plurality of main combustion chambers and a plurality of main combustion chambers, an intake manifold comprising, in combination: a main primary opening communicating with a main distribution cavity for a relatively lean air-fuel mixture, a main secondary opening communicating with the same cavity, an auxiliary opening communicating with an auxiliary distribution cavity for a relatively rich air-fuel mixture, passages in the intake manifold establishing communication from said main distribution cavity to the engine, additional passages in the intake manifold establishing communication from said auxiliary distribution cavity to the engine, said main distribution cavity being divided by wall means to form a first sub-cavity and a second sub-cavity, said first and second sub-cavities communicating with the main primary opening and the main secondary opening respectively, a hot water jacket positioned below the main and auxiliary distribution cavities having a water passage in order to avoid direct contact and rapid transfer of heat between said second sub-cavity and said water passage below the second sub-cavity, spaced apart from the area, both bottom walls of the auxiliary distribution cavity and the first sub-cavity being in direct contact with said water passage for rapid transfer of heat into the auxiliary distribution cavity and the first sub-cavity, means at a relatively high elevation for introducing hot water into said heating chamber, and an outlet from said heating chamber positioned at a relatively low elevation.

3. For use with an internal combustion engine having a plurality of main combustion chambers and a plurality of auxiliary combustion chambers, an intake manifold comprising, in combination: a main primary opening communicating with a main distribution cavity for a relatively lean air-fuel mixture, a main secondary opening communicating with the same cavity, an auxiliary opening communicating with an auxiliary distribution cavity for a relatively rich air-fuel mixture, passages in the intake manifold establishing communication from said main distribution cavity to the engine, additional passages in the intake manifold establishing communication from said auxiliary distribution cavity to the engine, said main distribution cavity being divided by wall means to form a first sub-cavity and a second sub-cavity, said first and second sub-cavities communicating with the main primary opening and the main secondary opening respectively, a hot water jacket positioned below the main and auxiliary distribution cavities having a water passage in order to avoid direct contact and rapid transfer of heat between said second sub-cavity and said water passage below the second sub-cavity spaced apart from the area, both bottom walls of that auxiliary distribution cavity and the first sub-cavity being in direct contact with said water passage for rapid transfer of heat into the auxiliary distribution cavity and the first sub-cavity, a pair of hot water inlets communicating with said heating chamber at spaced locations, and an outlet from said heating chamber.

4. For use with an internal combustion engine having a plurality of main combustion chambers and a plurality of auxiliary combustion chambers, an intake manifold comprising, in combination: a main primary opening communicating with a main distribution cavity for a relatively lean air-fuel mixture, a main secondary opening communicating with the same cavity, an auxiliary opening communicating with an auxiliary distribution cavity for a relatively rich air-fuel mixture, passages in the intake manifold establishing communication form said main distribution cavity to the engine, additional passages in the intake manifold establishing communication from the auxiliary named distribution cavity to the engine, said main distribution cavity being divided by wall means to form a first sub-cavity and a second sub-cavity, said first and second sub-cavities communicating with the main primary opening and the main secondary opening respectively, a hot water jacket positioned below the main and auxiliary distribution cavities having a water passage spaced apart from the area below the second sub-cavity, in order to avoid direct contact and rapid transfer of heat between said second sub-cavity and said water passage, both bottom walls of the auxiliary distribution cavity and the first sub-cavity being in direct contact with said water passage for rapid transfer of heat into the auxiliary distribution cavity and the first sub-cavity, and water jacket having an extension curving around a portion of said first distribution cavity, a hot water inlet at a relatively high elevation communicating with said heating chamber extension, and an outlet from said heating chamber positioned at a relatively low elevation.

* * * * *

UNITED STATES PATENT AND TRADEMARK OFFICE
CERTIFICATE OF CORRECTION

PATENT NO. : 4,201,168
DATED : May 6, 1980
INVENTOR(S) : Yasumichi Ohama

It is certified that error appears in the above-identified patent and that said Letters Patent are hereby corrected as shown below:

Column 2, line 65, "hacket 30" should read --jacket 30--.

Column 3, line 41, "main" should read --auxiliary--.

Column 4, line 42, "form" should read --from--.

Column 4, line 45, delete the word "named".

Signed and Sealed this

Twenty-ninth Day of July 1980

[SEAL]

*Attest:*

SIDNEY A. DIAMOND

*Attesting Officer*   *Commissioner of Patents and Trademarks*